United States Patent
Korman et al.

(10) Patent No.: US 8,455,752 B2
(45) Date of Patent: Jun. 4, 2013

(54) INTEGRAL AC MODULE GROUNDING SYSTEM

(75) Inventors: Charles Steven Korman, Niskayuna, NY (US); Neil Anthony Johnson, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 207 days.

(21) Appl. No.: 12/846,057

(22) Filed: Jul. 29, 2010

(65) Prior Publication Data

US 2012/0024563 A1    Feb. 2, 2012

(51) Int. Cl.
*H05K 5/02* (2006.01)

(52) U.S. Cl.
USPC .............. 136/251; 136/242; 136/243; 174/51

(58) Field of Classification Search
USPC .............. 174/51, 60; 439/92, 98, 100; 307/82; 136/251; 135/251
See application file for complete search history.

(56) References Cited

U.S. PATENT DOCUMENTS

| | | | |
|---|---|---|---|
| 6,111,189 A * | 8/2000 | Garvison et al. | 136/244 |
| 2004/0147172 A1 * | 7/2004 | Brown et al. | 439/701 |
| 2008/0283118 A1 * | 11/2008 | Rotzoll et al. | 136/251 |
| 2009/0314335 A1 | 12/2009 | McClintock | |
| 2010/0071748 A1 | 3/2010 | Brescia | |
| 2010/0194202 A1 * | 8/2010 | Sun | 307/82 |
| 2011/0083733 A1 * | 4/2011 | Marroquin et al. | 136/256 |
| 2011/0084556 A1 * | 4/2011 | Marroquin et al. | 307/82 |

FOREIGN PATENT DOCUMENTS

| | | |
|---|---|---|
| EP | 0977274 A2 | 2/2000 |
| WO | WO2009088977 A1 | 7/2009 |

* cited by examiner

*Primary Examiner* — Boris Chervinsky
*Assistant Examiner* — Pete Lee
(74) *Attorney, Agent, or Firm* — Seema S. Katragadda

(57) ABSTRACT

A photovoltaic (PV) ac-module grounding system includes a plurality of PV dc-voltage modules. Each PV dc-voltage module is integrated with a corresponding dc-ac micro-inverter to provide a corresponding PV ac-voltage module. Each PV ac-voltage module includes an ac-voltage plug and play connector that includes a dc ground conductor. Each dc-ac micro-inverter is internally electrically connected to its own chassis ground or metal enclosure which in turn is electrically connected to a corresponding dc ground conductor. A dc ground path is carried through an ac power bus from ac-voltage module to ac-voltage module through the plug and play connectors via the dc ground conductors.

15 Claims, 6 Drawing Sheets

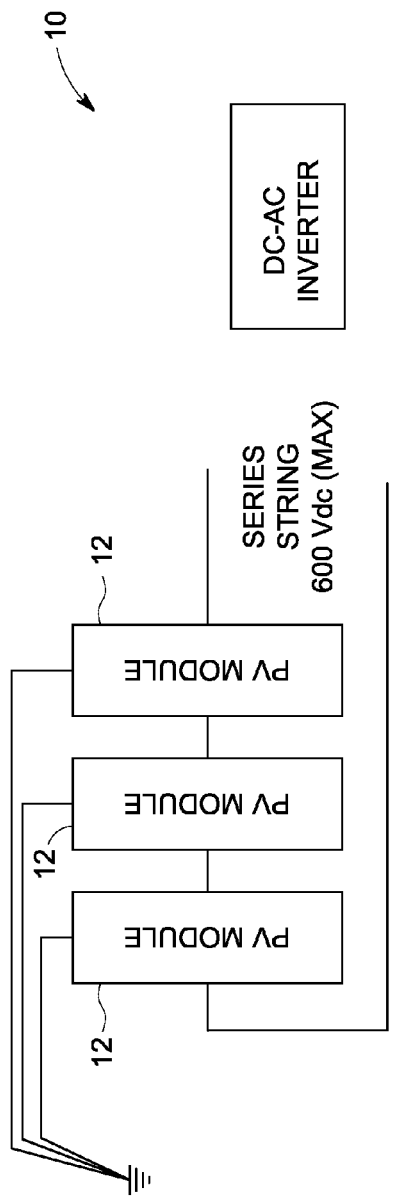
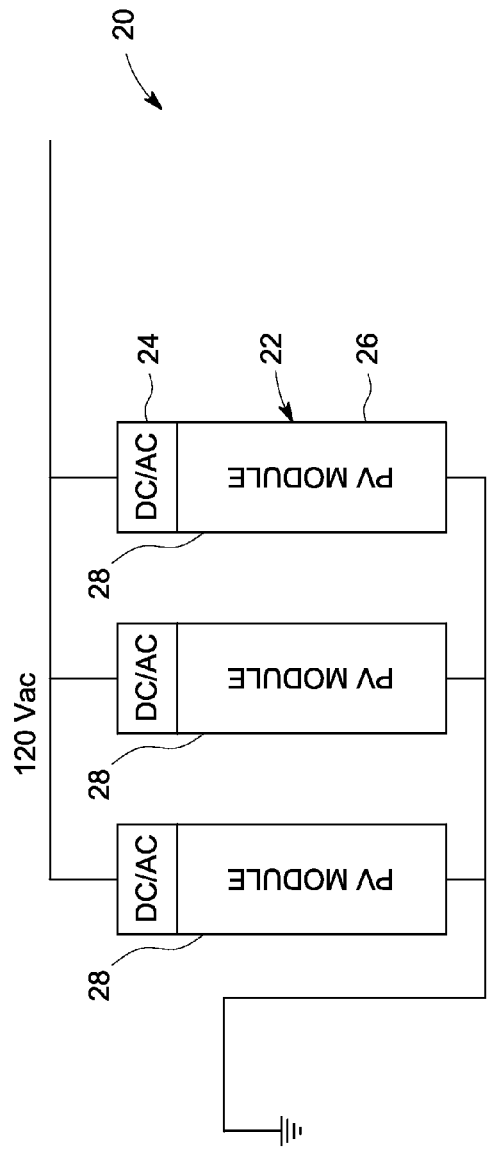
FIG. 1 PRIOR ART
FIG. 2 PRIOR ART

INTEGRAL AC MODULE GROUNDING SYSTEM

BACKGROUND

The invention relates generally to photovoltaic (PV) systems and more particularly to a system and method of implementing intra-module dc grounding for a system of PV ac modules.

Nearly all electrical systems in the U.S. are grounded to mitigate the impacts of lightning, line surges, or unintentional contact with high voltage lines. Most PV systems include modules with metal frames and metal mounting racks that are in exposed locations, e.g. rooftops where they are subject to lightning strikes, or are located near high voltage transmission lines that in the event of high winds, etc., can come into contact with PV arrays.

The modules in a typical PV array have aluminum frames that are often anodized. The 2008-NEC code that has the same requirements as the draft 2010-NEC code and governs installation of PV systems requires exposed metal surfaces be grounded. There are special dc wiring and grounding requirements that must be met specifically for dc module strings that can produce voltages at high as 600 volts. A failure in the insulating material of the PV laminate could allow the frame to be energized up to 600V dc.

The installer of a PV system is required to ground each module frame per the NEC code and UL standard 1703. This inter-module grounding must be met using a heavy, e.g. at least #10 gauge) copper wire and a 10-32 screw that can cut into the frame. Additional assurances are required even for frames having anodized surfaces. Washer/connectors in such cases are used to cut into the metal frame and provide the best electrical contact. These processes require additional components for installation and require a substantial level of effort to install mounting brackets and grounding wires.

Grounding continuity must also be addressed per the NEC code. The oldest NEC requirement necessitates making the ground connection first and breaking the ground connection last. Not all installations follow this practice. The circuit conductors should never be connected without a solid ground in place. GFI cannot prevent shock in this situation.

FIG. 1 illustrates a system of PV dc-voltage modules 10 configured to generate a desired dc output voltage that is known in the prior art. The system of PV dc-voltage modules 10 is a series configuration capable of generating up to 600V dc. Thus, a failure in the insulating material of the PV laminate could allow the corresponding frames to be energized up to 600V dc. A PV system installer is required to ground each module frame 12 per NEC code and UL standard 1703 as stated herein. Such frame-to-frame grounding is typically accomplished using a heavy gauge copper wire and a 10-32 screw that can cut into the frame(s). Further, washers/connectors are employed to ensure that reliable electrical contact is made and maintained, even for frames having anodized surfaces.

FIG. 2 illustrates a system of PV ac-voltage modules 20 configured to generate a desired ac output voltage that is known in the prior art. Each ac-voltage module 22 comprises a dc-ac micro-inverter 24 integrated therewith to generate the desired ac output voltage. The availability of such compact and efficient micro-inverters 24 and their integration with individual dc-voltage PV modules 26 has led to the commercial realization of the ac module 22 which produces a 120V ac or 240V ac output. The 2005 NEC code section 960.6 addresses the ac module. Because all of the dc wiring requirements are now considered to be integral to the ac module and are not accessible, dc requirements in the NEC code are no longer applicable and installation is simplified in that there is no longer a requirement to provide a physical dc disconnect switch.

Presently, all commercial systems that employ micro-inverters 24 still require an equipment ground, meaning that all modules with metallic frames 28 and metal mounting systems have to be connected to a common earth ground through a low resistance path. Such inter-module ground connections are still be made using processes that require the use of metallic splices, lugs, penetrating washers, and wires. All of these methods require hands-in grounding connections be made at the time of installation and usually requires the presence of an experience electrician.

In view of the foregoing, it would be advantageous to provide a system and method for implementing intra-module dc grounding for a system of PV ac modules, without necessitating use of metallic splices, screws, lugs, penetrating washers, brackets, wires and the like.

BRIEF DESCRIPTION

Briefly, in accordance with one embodiment, a photovoltaic (PV) grounding system comprises:

a plurality of dc-ac micro-inverters, each micro-inverter comprising a respective chassis ground, wherein each micro-inverter is configured together with a corresponding PV dc-voltage module to provide an ac-voltage module comprising a metallic enclosure and at least one ac-power connector, each ac-power connector comprising a dc-voltage ground conductor electrically connected to a corresponding chassis ground; and a frame structure comprising a metallic grounding frame configured to receive the plurality of ac-voltage modules such that the plurality of ac-power connectors together carry a dc-voltage ground connection from ac-voltage module to ac-voltage module through the plurality of ac-voltage modules via the plurality of dc-voltage ground conductors.

A photovoltaic (PV) grounding system according to another embodiment comprises:

a plurality of PV ac-voltage modules, each module comprising a metallic enclosure and at least one ac-power connector, each ac-power connector comprising a dc-voltage ground conductor; and a frame structure comprising a metallic grounding frame configured to receive the plurality of PV ac-voltage modules such that the plurality of ac-power connectors together carry a dc-voltage ground connection from ac-voltage module to ac-voltage module through the plurality of PV ac-voltage modules via the plurality of dc-voltage ground conductors.

DRAWINGS

These and other features, aspects, and advantages of the present invention will become better understood when the following detailed description is read with reference to the accompanying drawings in which like characters represent like parts throughout the drawings, wherein:

FIG. 1 illustrates a PV dc-voltage module grounding system that is known in the prior art;

FIG. 2 illustrates a PV ac-voltage module grounding system that is known in the art;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

All commercial systems that employ micro-inverters including products that integrate such micro-inverters onto a common aluminum module frame still require an equipment ground, meaning that all modules with metallic frames and metal mounting systems must be connected to a common earth ground through a low resistance path. Inter-module ground connections are still implemented using processes that require the use of metallic splices, lugs, penetrating washers, wires, and so on. These methods require hand-on grounding connections be made at the time of installation, and usually require the presence of an experience electrician.

Grounding requirements based on the latest NEC codes are different for ac modules since the dc wiring is not external to the module. A system ground is no longer required. However, since the inverter case is still exposed metal, the case is required to be grounded. The case ground can be accomplished via any suitable equipment ground; and the conductor size need not be any larger than the size of the power conductors or pin sizes in the micro-inverter cables. The present inventors alone recognized that the equipment ground which also serves to ground the case can be accomplished by including a grounding pin in the ac cable recognizing that a four pin cable would be sufficient. Known ac-voltage micro-inverter architectures do not employ space in the power cable and connector for a ground pin and wire. Use of such a structure would advantageously allow exposed metal frames and rail to be grounded using the same pin by providing suitable connections.

Figure 3:
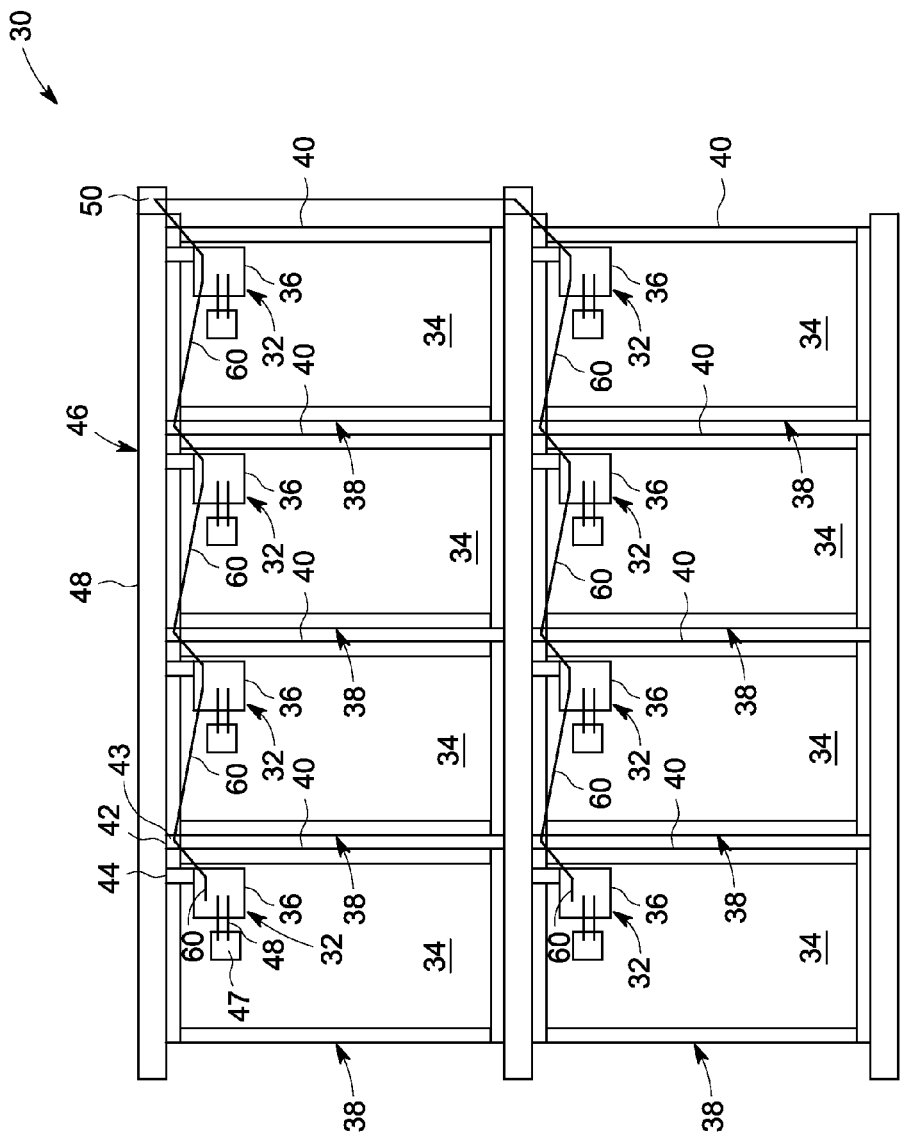
FIG. 3 illustrates a PV ac-voltage module grounding system according to one embodiment of the invention.

FIG. 3 illustrates a PV ac-voltage module grounding system 30 according to one embodiment of the invention. System 30 comprises a plurality of dc-ac micro-inverters 32. Each micro-inverter 32 is internally connected to a respective chassis ground or case 36 described in further detail herein with respect to FIG. 4. Each micro-inverter 32 is also integrated with a corresponding PV dc-voltage module 34 to provide a corresponding ac-voltage module 38. Each ac-voltage module 38 comprises a metallic enclosure or case 40 that includes a male ac-voltage plug and play connector 42 and a female ac-voltage plug and play connector 43.

Figure 9:
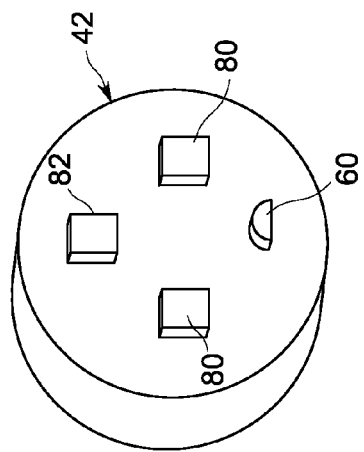
FIG. 9 illustrates a male ac power connector according to one embodiment suitable for use with the PV ac-voltage modules shown in FIGS. 3-6.
Figure 10:
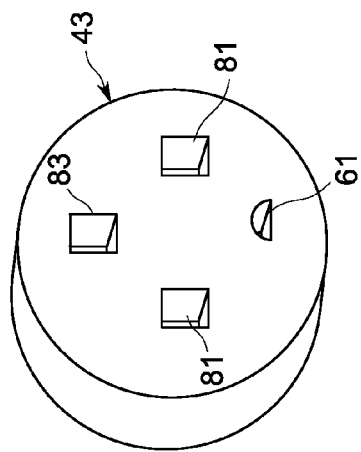
FIG. 10 illustrates a female ac power connector according to one embodiment suitable for use with the PV ac-voltage modules shown in FIGS. 3-6.

According to one embodiment, each male ac-voltage plug and play connector 42 comprises a pair of 120V ac-voltage pins 80, a neutral conductor pin 82 and a dc ground conductor pin 60 such as depicted in FIG. 9. Each corresponding female plug and play connector 43 comprises a pair of 120V ac-voltage slots 81, a neutral conductor slot 83 and a dc ground conductor slot 61 such as depicted in FIG. 10. Each plug and play connector dc ground conductor 60 is electrically connected internal to its corresponding micro-inverter 32 to a respective micro-inverter chassis/ground which may be, for example, the micro-inverter case 36.

The metal case 36 of each micro-inverter 32 is mechanically and electrically attached to the metallic frame 40 of a corresponding ac-voltage module 38 via, for example, a metallic frame attachment bracket 44 to form a low resistance grounding contact between the micro-inverter metal case 36 and the corresponding ac-voltage module metallic frame 40.

The micro-inverter dc inputs are connected to the ac-voltage module 38 through corresponding junction box 47 connectors 48. Each junction box 47 houses the normal +/− dc wiring/connectors of a PV module 34 and a micro-inverter 32. Since each micro-inverter case 36 is also electrically coupled to the metallic frame 40 of its corresponding ac-voltage module 38, the ground pin in each of the plug and play connectors 42, 43 automatically grounds all of the module frames 40 that are interconnected through the plug and play connectors 42, 43.

A frame structure 46 comprising a metallic grounding rail 48 is configured to receive the plurality of ac-voltage modules 38 such that the plurality of ac-power plug and play connectors 42, 43 together carry a dc-voltage ground connection 60 from ac-voltage module 38 to ac-voltage module 38 through the plurality of ac-voltage modules via the plurality of plug and play connector dc-voltage ground conductors. The plug and play dc ground conductors 60 are electrically connected to a connection box 50 at the end of each row that is electrically grounded to the ac-voltage module frames 40. The corresponding grounding path is depicted in further detail herein with respect to FIG. 4.

Figure 4:
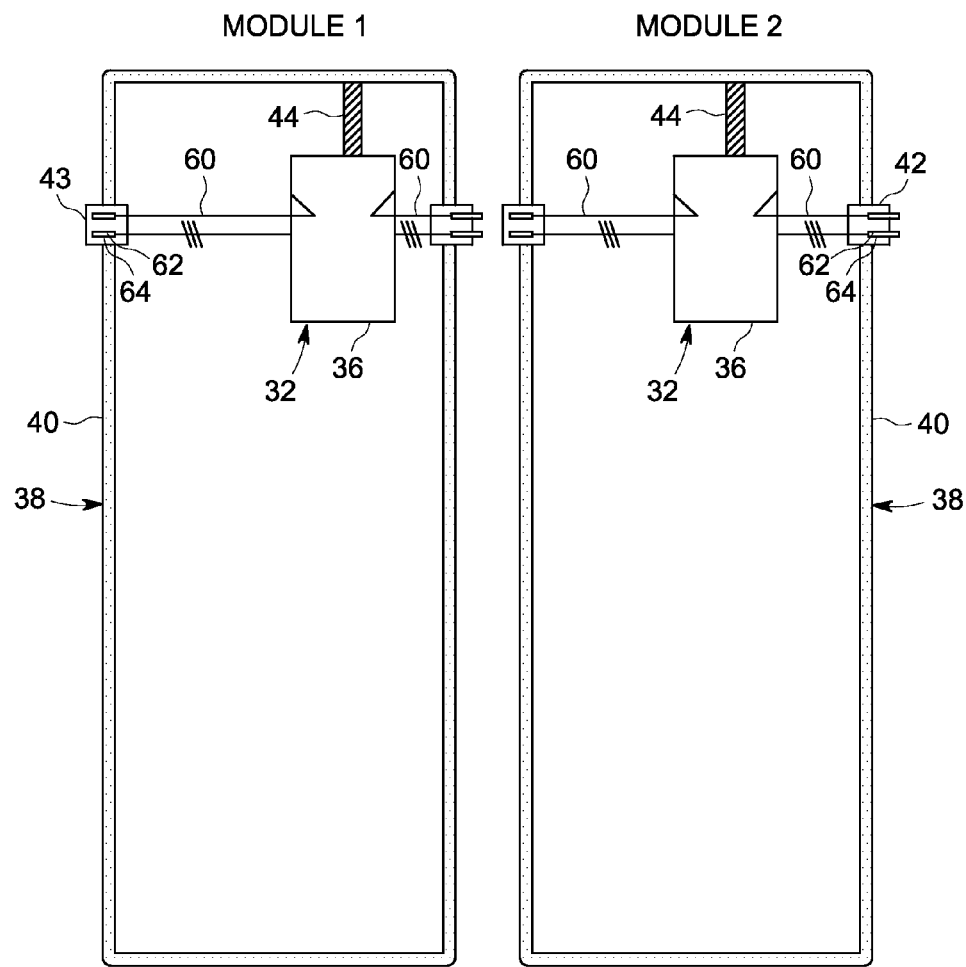
FIG. 4 is a more detailed diagram illustrating a plug and play ac-voltage power connector suitable for use with the system shown in FIG. 3 to carry a dc-voltage ground connection from ac-voltage module to ac-voltage module through the plurality of ac-voltage modules.

FIG. 4 is a more detailed diagram illustrating the dc grounding conductor path 60 carried through ac-power plug and play connectors 42, 43 shown in FIG. 3. The plug and play connectors 42, 43 carry a dc-voltage ground connection from ac-voltage module 38 to ac-voltage module 38 through the plurality of ac voltage modules 38. Each dc-ac micro-inverter 32 comprises a metallic case 36 that is mechanically connected or bonded to the metallic case of its corresponding PV ac-voltage module 38 via a metallic electrically conductive mounting bracket 44. Each ac-voltage module 38 comprises a male ac power connector 42 and a female ac power connector 43. Each power connector 42, 43 includes a dc grounding conductor that is connected to a corresponding micro-inverter 32 chassis/ground (case) 36 internal to its corresponding dc-ac micro-inverter 32 as shown. Each power connector 42, 43 further includes ac-voltage pins 62 and a neutral pin 64 according to one embodiment. Since each micro-inverter case 36 is electrically coupled to the metallic frame 40 of its corresponding ac-voltage module 38, the ground pins in the plug and play power connectors 42, 43 automatically ground all of the module frames 40 via grounding path 60 when all of the ac-voltage modules 38 are installed into a frame structure such as illustrated in FIG. 3.

Figure 5:
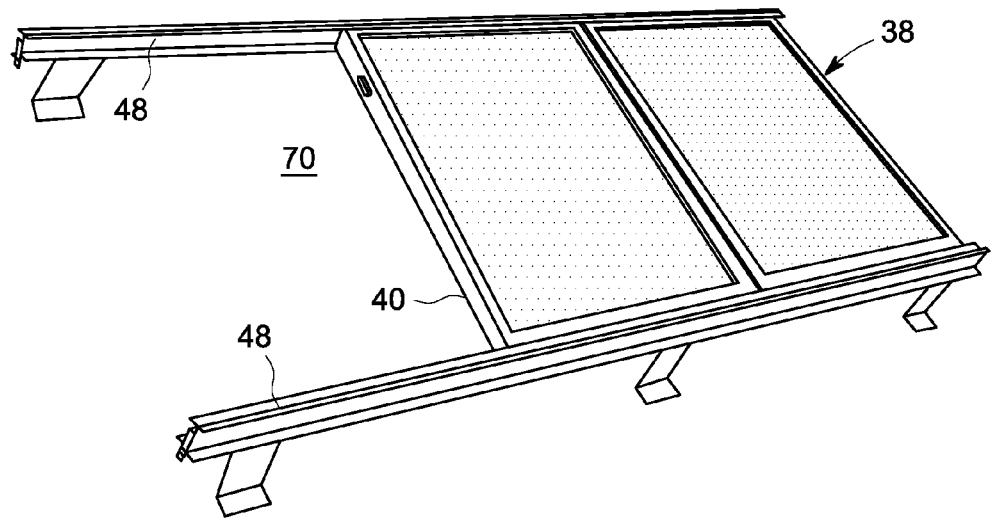
FIG. 5 is a perspective diagram illustrating a rail structure for mounting a plurality of PV ac-voltage modules that employs the plug and play connectors illustrated in FIGS. 3 and 4.

FIG. 5 is a perspective diagram illustrating a rail structure for mounting a plurality of PV ac-voltage modules 38 according to one embodiment. Rail structure 70 includes a plurality of metallic, electrically conductive mounting rails 48. Each PV ac-voltage module 38 comprises a metallic/conductive frame 40 as stated herein.

Figure 6:
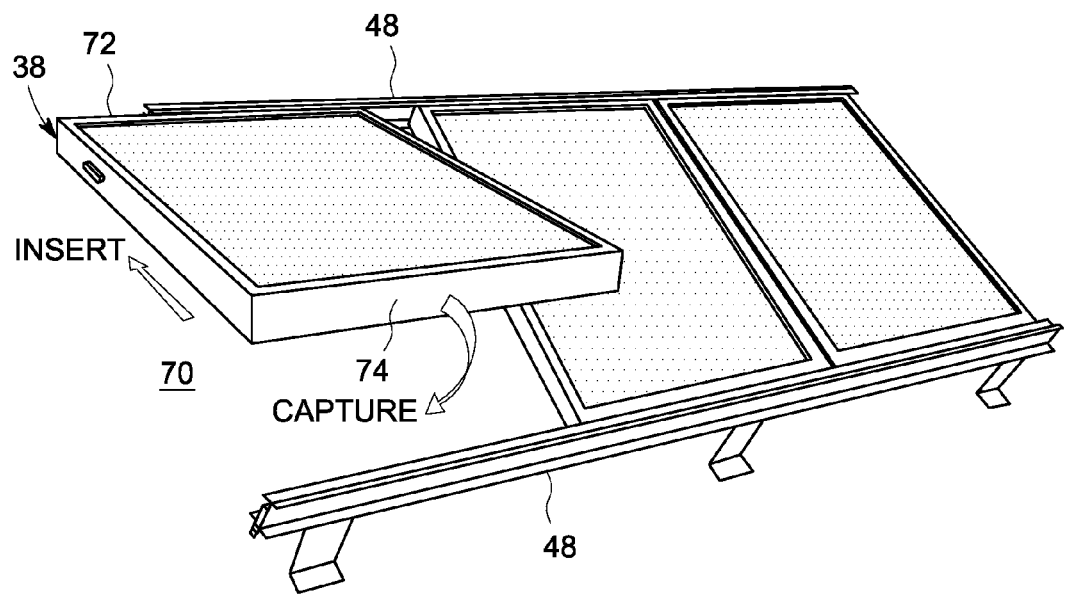
FIG. 6 is a perspective diagram illustrating insertion of a PV ac-voltage module into the rail structure depicted in FIG. 5.

FIG. 6 is a perspective diagram illustrating insertion of a PV ac-voltage module 38 into the rail structure 70. One edge 72 of the PV ac-voltage module 38 is first inserted into one of the mounting rails 48. The opposite edge 74 of the PV ac-voltage module 38 is then rotated toward and into the opposite mounting rail 48 to capture and hold the PV ac-voltage module 38 in place.

Figure 7:
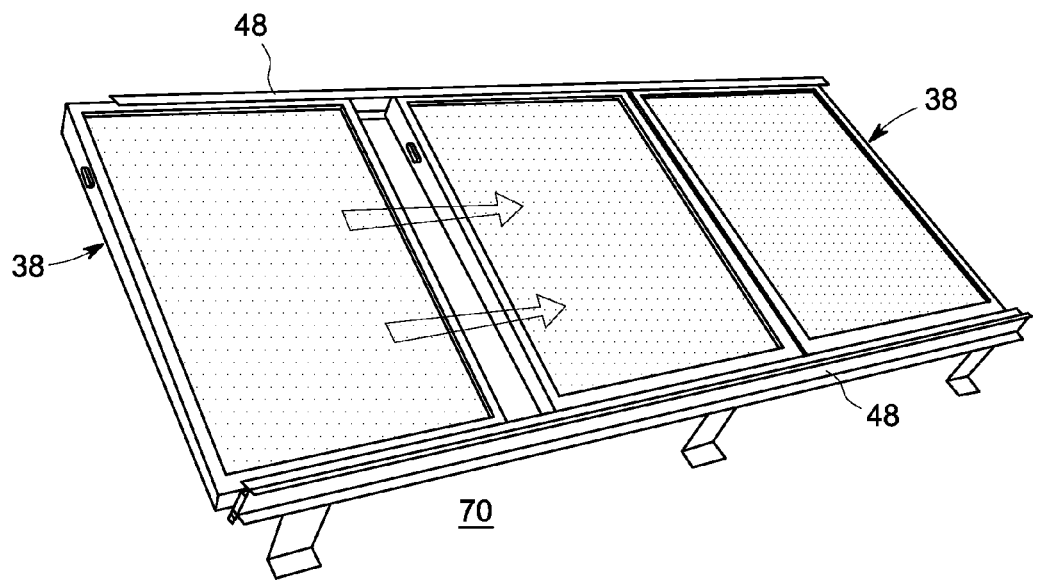
FIG. 7 is a perspective diagram illustrating inter-module coupling of individual PV ac-voltage modules inserted into the rail structure depicted in FIGS. 5 and 6.

FIG. 7 is a perspective diagram illustrating inter-module coupling of individual PV ac-voltage modules 38 inserted into the rail structure 70. The newly inserted PV ac-voltage module 38 is slid along the mounting rails 48 toward a PV ac-voltage module 38 that is already installed in the rail structure 70 and that is closest to the newly inserted PV ac-voltage module 38 until it is substantially flush against the previously inserted module 38. Each PV ac-voltage module 38 comprises male and female micro-inverter ac-voltage connectors 42, 43 described for one embodiment in further detail herein with reference to FIGS. 9-10. Sliding a pair of PV ac-voltage modules 38 together until substantially flush causes a corresponding male-female connector pair 42, 43 of ac-voltage connectors to electrically mate and complete both ac-voltage and dc-ground connections between the now mated PV ac-voltage modules 38.

Figure 8:
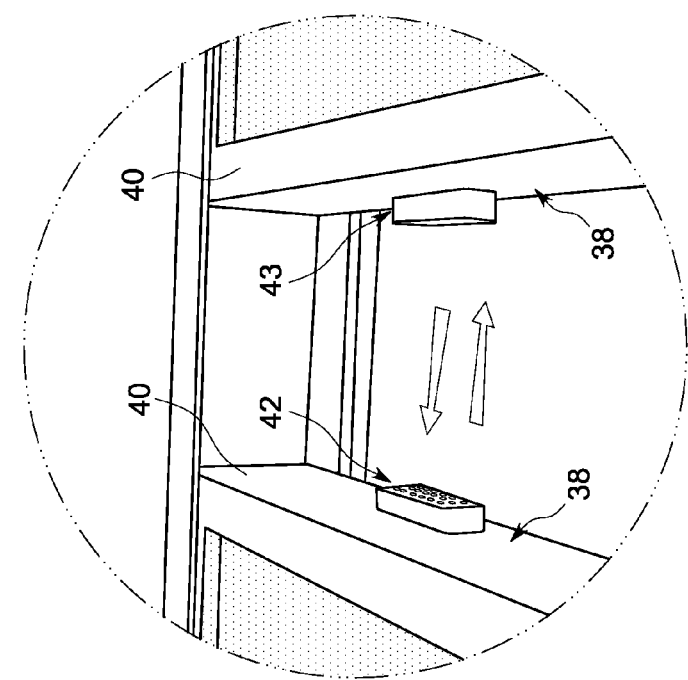
FIG. 8 is a more detailed diagram illustrating mating ac power connectors integrated with the PV ac-voltage modules shown in FIGS. 3-6.

FIG. 8 is a more detailed diagram illustrating mating male-female ac power connectors 42, 43 integrated with the PV ac-voltage modules 38 according to one embodiment. A male electrical connector 42 is integrated with the innermost side of a PV ac-voltage module frame 40, while the mating female electrical connector 43 is integrated with the outermost side of another PV ac-voltage module frame 40, or vice versa.

The mating male-female electrical ac-power connectors 42, 43 thus implement intra-module dc grounding for a system of PV ac-modules 38 having metallic/conductive frames 40. While a conventional approach requires the attachment of grounding wires or conductive clips to individual modules during installation that is time consuming and adds to installation costs, the male-female electrical connectors 42, 43 circumvent such requirements by adding a grounding connector pin to the ac-voltage electrical connectors 42, 43 that provides for module 38 interconnections and by arranging the grounding connector pin to be electrically connected to a corresponding micro-inverter chassis, case or equipment ground 36 and for the case 36 of the micro-inverter 32 to be grounded to the module frame 40 upon its attachment.

According to one embodiment illustrated in FIG. 9, each male micro-inverter connector 42 comprises a pair of ac-voltage (e.g. 120V ac) pins 80, a neutral connector pin 82, and an equipment ground (dc-voltage ground) connector pin 60. The corresponding micro-inverter female connector 43 illustrated in FIG. 10 comprises a pair of ac-voltage pin slots 81, a neutral connector pin slot 83 and an equipment ground connector pin slot 61. The male and female connectors 42, 43 are preferably keyed such as depicted according to one embodiment in FIGS. 9 and 10 to ensure proper electrical alignment when the plug and play modules 38 slide together.

In summary explanation, each micro-inverter 32 internally grounds its corresponding positive dc module conductor grounding pin 60. The internal grounding bond (via the dc ground fault protection circuits, NEC 690.5) requires that the inverter have a dc grounding electrode terminal that is located on the outside of the inverter case 36. When the inverter case 36 is attached to the ac-voltage module frame 40 using a star washer or other attachment process that guarantees a low resistance, reliable ohmic contact, then the module frame 40 and inverter case 36 have a common equipment ground. The inverter electrical connectors 42, 43 provide a fourth conductor pin 60. Connecting the fourth conductor pin 60 to the inverter 32 internal grounding bond provides a grounding pathway between all of the modules 38 on a common insert and capture rail 70 when the connectors 42, 43 are mated together to implement a capture/plug and play solar electric system.

According to one aspect, electrical connectors 42, 43 each are configured with a chassis ground connection to ensure safe grounding when the electrical connection is made. The chassis ground connections are configured to maintain consistency with the National Electrical Code (NEC) that requires conformance with the make first, break last rule regarding the chassis ground connection. This feature eliminates the need to physically install grounding wires or clips between modules 38 when installing additional PV ac-voltage modules 38 into the capture/plug and play solar electric system that employs an earth grounded mounting rack/rails 48.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A photovoltaic (PV) grounding system comprising:
a plurality of ac-voltage modules comprising a plurality of dc-ac micro-inverters and a plurality of PV dc-voltage modules, wherein each of the plurality of dc-ac micro-inverters is integrated with a corresponding PV dc-voltage module to form an ac-voltage module, wherein each dc-ac micro-inverter comprises a respective chassis ground, wherein each ac-voltage module comprises a metallic enclosure and at least one ac-power connector, and wherein the at least one ac-power connector comprises a dc-voltage ground conductor electrically connected to a corresponding chassis ground; and
a frame structure comprising a metallic grounding frame configured to receive the plurality of ac-voltage modules such that the at least one ac-power connector carries a dc-voltage ground connection from ac-voltage module to ac-voltage module through the plurality of ac-voltage modules via the dc-voltage ground conductors corresponding to the plurality of ac-voltage modules.

2. The PV grounding system according to claim 1, wherein each ac-voltage connector further comprises a neutral voltage conductor pin and one or more ac-voltage pins.

3. The PV grounding system according to claim 1, wherein the dc-voltage ground conductor comprises a make first, break last ground connection.

4. The PV grounding system according to claim 1, wherein each ac-voltage connector is selected from a 120V-ac connector and a 240V-ac connector.

5. The PV grounding system according to claim 1, wherein each micro-inverter chassis ground is electrically connected to its corresponding ac-voltage module enclosure via a respective fixed non-insertable metallic grounding element.

6. The PV grounding system according to claim 1, wherein at least one ac-voltage module enclosure is electrically connected to the metallic grounding frame via a respective fixed non-insertable metallic grounding element.

7. The PV grounding system according to claim 1, wherein at least one ac-voltage connector comprises a male connector and at least one other ac-voltage connector comprises a female connector, wherein each male ac-voltage connector is keyed to ensure proper electrical alignment with each female ac-voltage connector.

8. A photovoltaic (PV) grounding system comprising:
a plurality of PV ac-voltage modules, wherein each of the plurality of PV ac-voltage modules comprises a metallic enclosure and at least one ac-power connector, and wherein the at least one ac-power connector comprises a dc-voltage ground conductor; and
a frame structure comprising a metallic grounding frame configured to receive the plurality of PV ac-voltage modules such that the at least one ac-power connector carries a dc-voltage ground connection from ac-voltage module to ac-voltage module through the plurality of PV ac-voltage modules via the dc-voltage ground conductors corresponding to the plurality of ac-voltage modules.

9. The PV grounding system according to claim 8, wherein each PV ac-voltage module further comprises:
a PV dc-voltage module; and
a dc-ac micro-inverter comprising a chassis ground electrically connected to a corresponding dc-voltage ground conductor, wherein the PV dc-voltage module and the dc-ac micro-inverter together are configured to generate a desired ac-voltage.

10. The PV grounding system according to claim 9, wherein each dc-ac micro-inverter chassis ground is electrically connected to its corresponding ac-voltage module enclosure via a respective fixed non-insertable metallic grounding element.

11. The PV grounding system according to claim 8, wherein at least one ac-voltage module enclosure is electrically connected to the metallic grounding frame via a respective fixed non-insertable metallic grounding element.

12. The PV grounding system according to claim 8, wherein each ac-voltage connector further comprises a neutral conductor pin and one or more ac-voltage pins.

13. The PV grounding system according to claim 8, wherein the dc-voltage ground conductor comprises a make first, break last ground connection.

14. The PV grounding system according to claim 8, wherein each ac-voltage connector is selected from a 120V-ac connector and a 240V-ac connector.

15. The PV grounding system according to claim 8, wherein at least one ac-voltage connector comprises a male connector and at least one other ac-voltage connector comprises a female connector, wherein each male ac-voltage connector is keyed to ensure proper electrical alignment with each female ac-voltage connector.

* * * * *